Patented Jan. 5, 1937

2,066,685

UNITED STATES PATENT OFFICE 2,066,685

PROCESS OF RECOVERING SULPHURIC ACID FROM SEPARATED SLUDGE ACID

Ingenuin Hechenbleikner and Frank J. Bartholomew, Charlotte, N. C., assignors to Chemical Construction Corporation, Charlotte, N. C., a corporation of Delaware No Drawing. Application April 17, 1931, Serial No. 531,004

2 Claims. (Cl. 23—173)

This invention relates to an improved method of recovering sulphuric acid from separated dilute sludge acid, and has special reference to the provision of a method of treating the separated sludge acid by the application of heat and pressure to produce sulphuric acid free of tarry or oil residue.

In the refining of petroleum, the crude oil or its fractional or cracked distillates is treated with concentrated sulphuric acid, which acid removes the heavy hydrocarbons and the aromatic and unsaturated hydrocarbons from the crude oil or its distillates, combining therewith to form a mixture of sulphonic acids, which mixture is precipitated from the treated oils in a tarry sludge known as petroleum or acid sludge. This acid sludge contains sulphuric acid, sulphonic acids, acid tar and oils, the relative proportions of which differ in different sludges and vary according to the nature of the crude oil treated and the strength of the acid used in the treatment.

Various methods of recovering the sulphuric acid from acid sludge have heretofore been suggested and practiced. Among these methods is that known as the pressure separation method, which consists in subjecting either acid sludge (unseparated sludge) or separated sludge acid to the action of heat under elevated pressures in a closed or pressure retort, this treatment resulting in hydrolyzing or reconverting the sulphonic acids to produce sulphuric acid, and in producing a separation into different layers of the tar or oil residue or constituent of the sludge and of the sulphuric acid. The acid and tar or oil thus separated are then drawn separately from the retort, the acid being in a purified condition suitable for concentration.

We have discovered that separated sludge acid may be treated in a pressure retort by subjecting the separated sludge acid to heat at temperatures higher than heretofore practiced, and that with such treatment the hydrocarbons are broken down and sulphuric acid free of a tarry or oil residue or layer is produced in the retort. More specifically, we have found that when separated sludge acid is heated at temperatures under 350° F., separation of the tar or oil from the acid, as aforesaid, takes place, necessitating the separate removal of the separated hydrocarbons and the sulphuric acid, but that if the heat treatment is carried on at temperatures of 350° F. or over, preferably around 360° F., separation does not take place, and sulphuric acid free of tarry or oil residue is produced. This heat treatment of separated sludge acid at temperatures of 350° F. and above is apparently a cracking process in which the sulphuric acid and hydrocarbon compounds formed in the treating of oils and which are soluble in weak acid are broken down. The cracking results in the formation of light inflammable hydrocarbon vapors and there is no breakdown of acid. The hydrocarbon vapors produced are preferably expelled or discharged from the pressure retort during treatment and burned. The odor of $SO_2$ gas is entirely absent when the gases or vapors are discharged from the pressure retort. During this heat treatment substantially no decomposition of acid takes place; and the resulting acid is found to be of a quality which may be readily concentrated without reduction or decomposition to very high strengths, the concentrated acid having a very low content of inert carbon.

The prime object of our present invention therefore is directed to the provision of an improved process for treating separated sludge acids by the application of heat and pressure to break down and expel the hydrocarbons, whereby sulphuric acid is recovered free of any tarry or oil residue and in a purified condition suitable for concentration to high strengths.

There are three principal sources of separated sludge acid, these being light oil sludge, lubricating sludge, and crude sludge. Light oil sludge is the result of treating light distillates, such as gasoline and kerosene. Part of this sludge is from the treating of cracked distillates which usually give a separated acid of fairly high carbon content. Lubricating sludge is very thick and heavy and while it cannot be handled by the heat and pressure treatment, the separated acid of course can be treated in the same manner as the separated acids from light oil, sludge or crude sludge.

The separated sludge acid used in the pressure treatment of the present invention is obtained from the sludge or acid sludge by well-known methods of mixing the sludge with water or steam and permitting the same to settle. This operation causes a separation of oil and tar from a still impure sulphuric acid having a strength of the order of 29° to 33° Baumé. This still impure sulphuric acid is the separated sludge acid which is subjected to the heat and pressure treatment of our present process.

The process of our present invention may be carried on with the application of indirect heat to the pressure retort containing a charge of separated sludge acid, or by the application of such indirect heat combined with open steam treatment of the separated sludge acid. When indirect heat only is used, the sulphuric acid is concentrated during the treatment. When open steam treatment is combined with indirect heat, the sulphuric acid may be diluted during the treatment.

The pressure retort to be used in the process may be of any approved type. As an example, such pressure retort may comprise a steel tank three feet in diameter and four feet deep with heavy top and bottom heads. The walls may be lined with lead and brick. For indirect heating the retort may be interiorly provided with a length of, for example, fifty feet of a closed coil made of one inch lead pipe; and where an open steam line is to be combined with the indirect heating a one inch open steam line may be used. The bottom head of the retort may contain the necessary connections for the steam lines, and may be provided with the acid discharge line. The top head of the retort may be provided with the line for charging the retort and with the valve for venting the light hydrocarbons formed during the treating process.

The practice of the process and the results produced thereby may be explained more specifically by the following examples of operating tests of the process carried out on separated sludge acids obtained from different types of sludge and under varying conditions:

Example No. 1

A pressure retort, such as hereinabove described, charged with 707 lbs. of separated sludge acid, having a gravity of 29.0° Baumé and obtained from crude sludge, is heated by indirect heat only obtained with the closed coil system, and the separated sludge acid is subjected to heat treatment for a period of 2½ hours. The pressure developed in the retort is from 64 to 80 lbs. The steam pressure in the steam coils is about 130 lbs. and the temperature developed and maintained in the retort is 355° F. The hydrocarbon gases produced are vented to the atmosphere during the treatment.

As a result of this treatment, sulphuric acid is produced in the retort free of any tarry or oil residue, having a weight of 573 lbs. and a specific gravity of 35.4° Baumé. The sulphuric acid yield is found to be 100%. While the boiling down yield of untreated separated sludge acid is 85.1% and the carbon content is 6.01%, it is found that after the treatment the sulphuric acid yield is about 95% with a carbon content of less than 1%. These results show, therefore, that the heat and pressure treatment breaks down and eliminates the hydrocarbons, effects a partial concentration of the sulphuric acid, and produces a sulphuric acid product possessing an improved boiling down yield and a reduced carbon content. The treatment is also found to show a considerable improvement in the appearance of the resulting acid. The 100% yield further shows that the treatment does not result in any decomposition of acid, but, on the contrary, produces a reversion of the acid treatment reaction. These results also indicate the improvement capable of being effected for separated acid obtained from crude sludge.

Example No. 2

The pressure retort charged with 759 lbs. of a mixed feed of separated sludge acid, having a very low proportion derived from crude sludge and having a specific gravity of 29° Baumé, is heated by indirect heat only obtained with the closed coil system, and the separated sludge acid is subjected to heat treatment for a period of four hours. The pressure developed in the retort is from 65 to 80 lbs. The steam pressure in the closed coil system is about 130 lbs., and the temperature developed and maintained in the retort is about 350° F. The hydrocarbons are broken down and permitted to escape through the vent during the treatment.

As a result of this treatment, sulphuric acid is produced in the retort free of any tarry or oil residue, having a weight of 622 lbs. and a specific gravity of 34.5° Baumé. The sulphuric acid yield is again found to be 100%. Although the separated sludge acid used in this example was of good quality to begin with, the treatment reduced the carbon content by 33⅓% (from .65% to .44%) and increased the boiling down yield. It will also be noted that here again the treatment is shown to effect a partial concentration of the recovered sulphuric acid. The recovered sulphuric acid may be concentrated without decomposition taking place.

Example No. 3

An example will now be given in which open steam treatment is combined with indirect heating.

A pressure retort having a capacity of 15 gals. and containing a closed steam coil for indirect heating and also an open steam line for direct heating, and charged with 10 gals. of separated sludge acid having a specific gravity of 22° Baumé, is first subjected to treatment with the indirect heat through which steam having a pressure of 150–160 lbs. is circulated. The pressure developed in the retort in 37 minutes rises to 105 lbs. and remains stationary while the temperature rises to 320° F. Live steam is then turned into the separated sludge acid charge, and in 40 minutes the developed pressure reaches 155 lbs. and a temperature of 352° F. The exhaust pipe of the retort is opened during the treatment and the emitted gas is burned. At the end of about 2½ hours the steam is cut off and the acid drained.

The sulphuric acid obtained in the retort and drained therefrom is found to be free of any tarry or oil residue. A 100% yield is obtained, and while the boiling down test on the untreated acid shows a yield of 82.7%, a similar test on the thus treated acid shows a yield of 92.5%. The acid obtained is very bright in color and has no pungent odor. This heat and pressure treatment using both indirect heat and open steam treatment therefore also produces a breakdown of the hydrocarbons, resulting in a recovered sulphuric acid free of any oil or tar constituent, which possesses an improved boiling down yield and a reduced carbon content.

Example No. 4

An example will now be given in which the indirect heating was produced by means other than the closed coil system.

A pressure retort consisting of a steel pot having a capacity of about 4½ gals., lead lined, is filled to three-quarters of its depth with separated sludge acid having a specific gravity of 27.5° Baumé. The retort is heated by means of nichrome resistance wire and a large gas burner. The acid in the retort is brought to a temperature of 355° F. after about an hour, and this temperature is maintained for a period of one hour. A pressure of about 100 lbs. is developed in the retort. After an hour at this temperature of 355° F. the steam and light gaseous vapor is discharged to the atmosphere and the acid is then discharged from the retort.

As a result of this treatment, sulphuric acid is produced in the retort free of any tarry or oil residue having a specific gravity of 31° Baumé. While the boiling down yield of the separated sludge acid untreated is about 80%, it is found that after the treatment the sulphuric acid boiling down yield is about 95%. An increase of about 15% of concentration yield is thus found possible by this treatment.

The method of practicing the process of our present invention will in the main be fully apparent from the above detailed description thereof. It will be further apparent that while we have explained the invention by reference to various examples thereof, many changes and modifications may be made in the steps of the process without departing from the spirit of the invention defined in the following claims.

We claim:

1. The method of recovering sulphuric acid from separated dilute sludge acid which consists in subjecting the separated sludge acid, under a pressure sufficiently elevated to prevent distillation of sulphuric acid at the temperature used, to heat treatment at about 350° to 375° F. for a sufficient length of time so that hydrocarbon compounds present are vaporized, and separately withdrawing the hydrocarbons as distillate and the dilute acid as a residue.

2. The method of recovering sulphuric acid from separated dilute sludge acid which consists in subjecting the separated sludge acid, under a pressure sufficiently elevated to prevent distillation of sulphuric acid at the temperature used, to heat treatment at a temperature high enough to vaporize hydrocarbon compounds, and not high enough to decompose the acid, the heating being maintained for a sufficient length of time so that the hydrocarbon compounds present are vaporized and separately withdrawing the hydrocarbons as distillate and the dilute acid as a residue.

INGENUIN HECHENBLEIKNER.
FRANK J. BARTHOLOMEW.